(12) United States Patent
Hegde et al.

(10) Patent No.: US 7,386,633 B2
(45) Date of Patent: Jun. 10, 2008

(54) PRIORITY BASED DIFFERENTIATED DNS PROCESSING

(75) Inventors: Nikhil Hegde, Austin, TX (US); Rashmi Narasimhan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 11/111,506

(22) Filed: Apr. 21, 2005

(65) Prior Publication Data
US 2006/0242321 A1  Oct. 26, 2006

(51) Int. Cl.
*G06F 15/16* (2006.01)
*G06F 15/173* (2006.01)
*G06F 17/30* (2006.01)

(52) U.S. Cl. .......... 709/245; 709/202; 709/225; 709/232; 709/246; 709/226; 707/1; 707/2; 707/10; 707/100; 707/103

(58) Field of Classification Search ............ 709/245, 709/225, 226, 232, 246
See application file for complete search history.

(56) References Cited

U.S. PATENT DOCUMENTS

| | | | |
|---|---|---|---|
| 6,976,090 B2* | 12/2005 | Ben-Shaul et al. | 709/246 |
| 7,013,343 B2* | 3/2006 | Shigezumi | 709/232 |
| 7,099,957 B2* | 8/2006 | Cheline et al. | 709/245 |
| 7,124,188 B2* | 10/2006 | Mangipudi et al. | 709/226 |
| 7,225,272 B2* | 5/2007 | Kelley et al. | 709/245 |
| 2001/0052007 A1 | 12/2001 | Shigezumi | 709/223 |
| 2004/0194102 A1 | 9/2004 | Neerdaels | 718/100 |
| 2005/0182781 A1* | 8/2005 | Bouvet | 707/102 |

FOREIGN PATENT DOCUMENTS

WO  WO 02/069608 A2  9/2002

OTHER PUBLICATIONS

Charles W. Kaufman, Domain Name System Protocol Security Extensions, Feb. 23, 1994, 36 pages☐☐☐☐.*
U.S. Appl. No. 10/279,789, filed Oct. 24, 2002, Gloe, Method and Apparatus for Maintaining Internet Domain Name Data.
U.S. Appl. No. 10/782,668, filed Feb. 19, 2004, Accapadi et al., User Defined Preferred DNS Reference.

* cited by examiner

*Primary Examiner*—Jeffrey Pwu
*Assistant Examiner*—Sulaiman Nooristany
(74) *Attorney, Agent, or Firm*—Duke W. Yee; Matthew W. Baca; Theodore D. Fay, III

(57) ABSTRACT

Prioritizing requests made to a domain name system server to translate domain names into Internet Protocol addresses. First, the request is received in the domain name server. Next, the request is prioritized based on the source sending the request. Finally, the request is processed according to a priority assigned to the request.

14 Claims, 3 Drawing Sheets

PRIORITY BASED DIFFERENTIATED DNS PROCESSING

BACKGROUND OF THE INVENTION

1. Technical Field

The present invention relates generally to an improved data processing system and in particular to a method and apparatus for processing data. Still more particularly, the invention relates to priority based processing of requests in a domain name system (DNS) server.

2. Description of Related Art

In very large networks, such as the Internet, Web sites have associated domain names so that users can easily remember and identify Web site locations. For example, mydomain123.com is a domain name that a user may enter into a Web browser. The browser retrieves information contained in a remote computer associated with that domain name, such as pictures, text, videos, files, links to other Web sites, and other content.

However, the client computer cannot use the alphanumeric domain name to find a particular Internet address. Instead, the domain name must be translated into an Internet Protocol (IP) address that data processing systems can recognize and use. An example of an IP address is 123.45.67.890.

A current method of performing the translation between domain names and IP addresses is to use a domain name system (DNS) server to perform the translation. The DNS server contains a database that associates domain names with IP addresses. Thus, when a domain name is entered in a browser, the browser communicates with a DNS server and requests the IP address associated with the domain name. In turn, the DNS server transmits the appropriate IP address to the client computer running the browser. The client computer then accesses the desired website using the IP address acquired from the DNS server.

Currently, a DNS server processes domain name translation requests on a first-come, first-serve basis. However, a problem has arisen in the current domain name system. Because of the dramatic growth of the Internet, a DNS server must be able to handle a truly vast number of requests for domain name translation. Even a simple command like "netstat –r" on a machine with a large routing table can cause a reasonably large burst of DNS translation requests. The problem can be exacerbated by malicious flooding attacks, which attempt to overwhelm a DNS server with too many spurious requests for domain name translation. Thus, translation requests that are considered important are delayed or even dropped as the DNS server attempts to handle vast numbers of less important requests. Hence, it would be advantageous to have a method, data processing system, and computer-implemented instructions for managing requests for domain name translations.

SUMMARY OF THE INVENTION

The present invention provides a method, apparatus and computer instructions for prioritizing requests in a domain name system server to translate domain names into Internet Protocol addresses. First, the request is received in the domain name server. Next, the request is prioritized based on the source sending the request. Finally, the request is processed according to a priority assigned to the request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
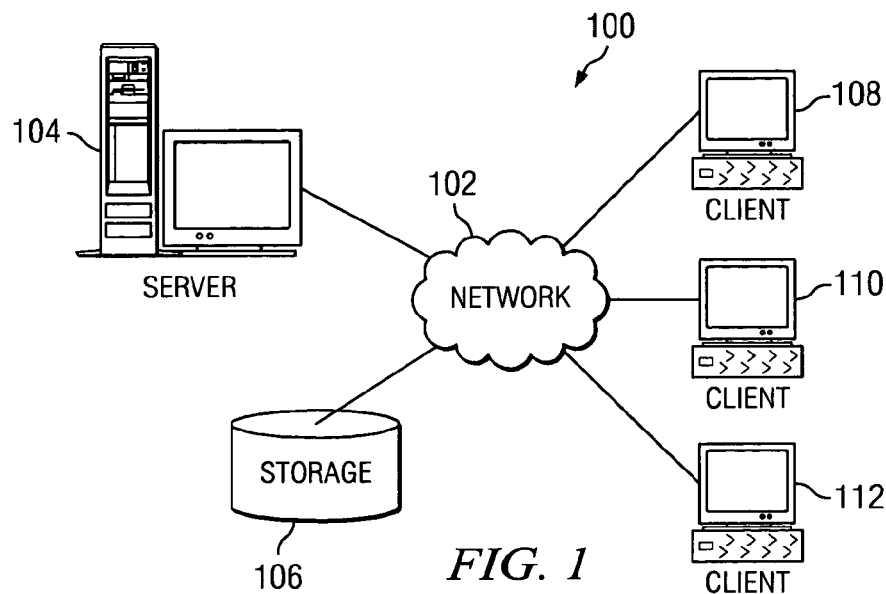
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
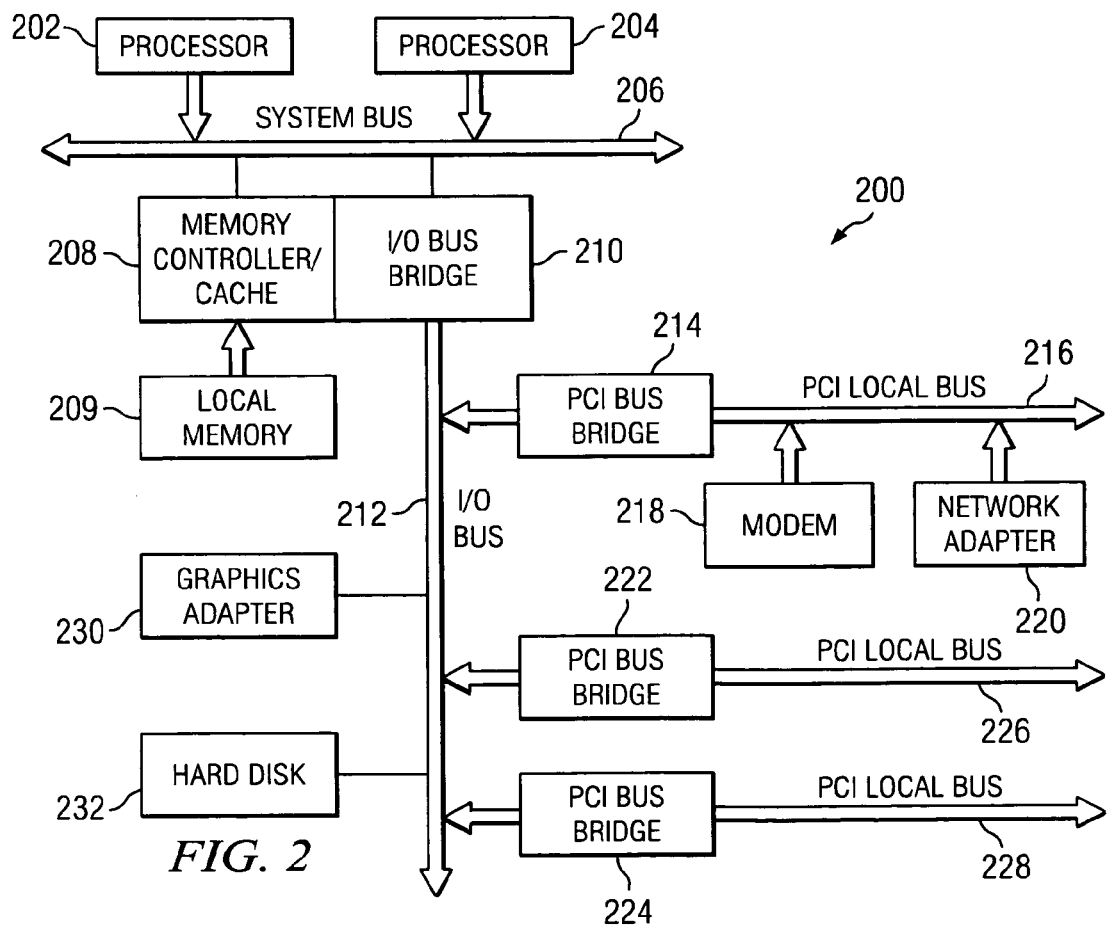
FIG. 2 is a block diagram of a data processing system that may be implemented as a server in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eserver pseries system, a product of International Business Machines Corporation in Armonk, N.Y., running the Advanced Interactive Executive (AIX) operating system or LINUX operating system.

Figure 3:
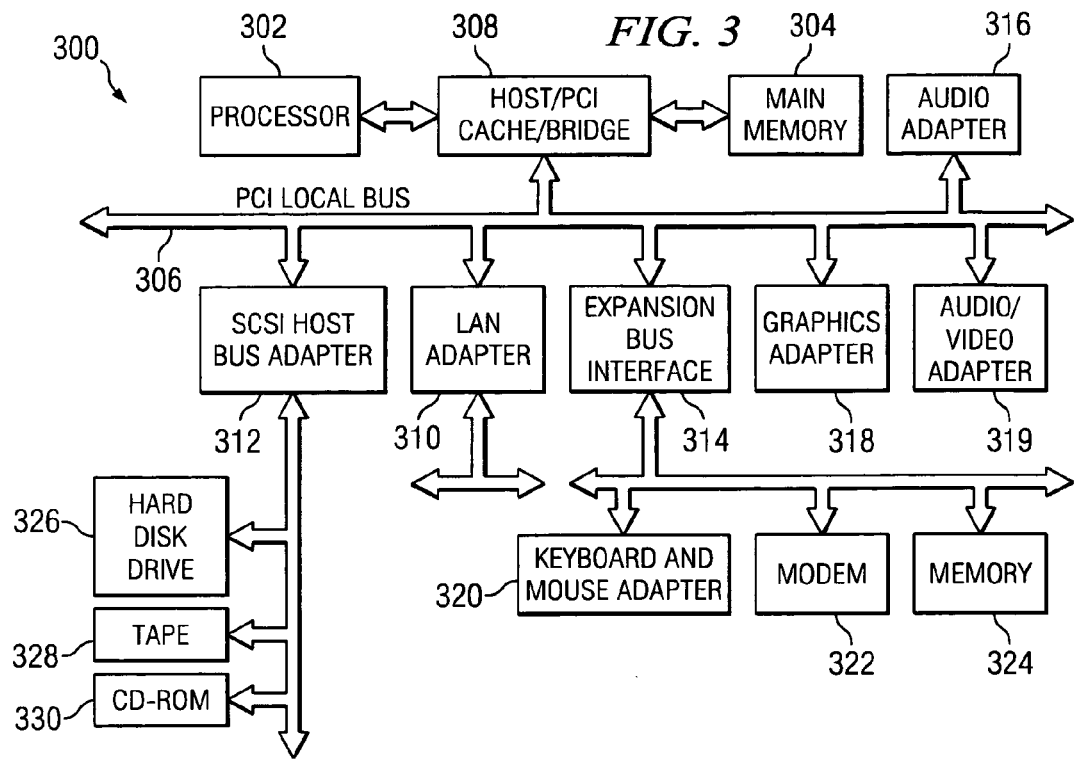
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as JAVA may run in conjunction with the operating system and provide calls to the operating system from JAVA programs or applications executing on data processing system 300. "JAVA" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. In addition, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus and computer instructions for prioritizing requests in a domain name system (DNS) server to translate domain names into Internet Protocol addresses. First, the request is received in the domain name server. Next, the request is prioritized based on the source sending the request. Finally, the request is processed according to a priority assigned to the request.

Figure 4:
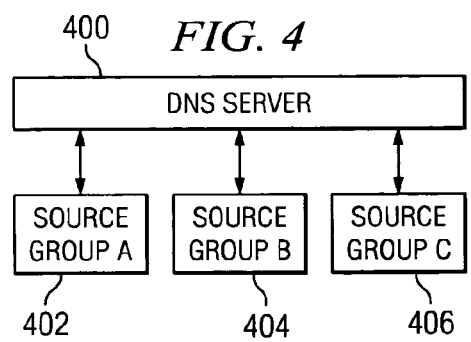
FIG. 4 is a block diagram illustrating different groups of source data processing systems interacting with a DNS server, in accordance with a preferred embodiment of the present invention.

FIG. 4 is a block diagram illustrating different groups of source data processing systems interacting with a DNS server, in accordance with a preferred embodiment of the present invention. DNS server 400 may be a server data processing system, such as server 104 in FIG. 1 or data processing system 200 in FIG. 2. Source Group A 402, Source Group B 404, and Source Group C 406 may each contain a number of server and client data processing systems, such as server 104 in FIG. 1, data processing system 200 in FIG. 2, clients 108, 110, and 112 in FIG. 1, and data processing system 300 in FIG. 3. DNS server 400 may connect to each data processing system in Source Group A 402, Source Group B 404, and Source Group C 406 via a network, such as network 102 in FIG. 1 or the Internet. Each data processing system in each source group may also be part of the network.

DNS server 400 processes requests from a wide variety of source data processing systems in each of Source Group A 402, Source Group B 404, and Source Group C 406. Each request is a request to translate an alphanumeric domain name, such as mydomain.com, into an Internet Protocol address, such as 123.45.67.890. DNS server 400 contains a large database of domain names, corresponding Internet Protocol addresses, appropriate software and hardware to perform the translation, and appropriate software and hardware to transmit the translated Internet Protocol address back to the requesting source data processing system.

In an illustrative embodiment, requests from Source Group A 402 should be given higher priority than requests from Source Group B 404. In turn, requests from Source Group B 404 are to be given higher priority than requests from Source Group C 406. For example, Source Group A 402 may be other DNS servers, Source Group B 404 may be data processing systems that have been given a preselected priority, and Source Group C 406 may be any other data processing system making a request of DNS server 400.

DNS server 400 includes a database containing data regarding a variety of source data processing systems. DNS server 400 may use the database to assign a priority to a request to translate a domain name. For example, DNS server 400 may include a database that allows DNS server 400 to recognize whether a request comes from a data processing system in Source Group A 402, Source Group B 404, or Source Group C 406. DNS server 400 will then assign a priority to the request accordingly.

Although FIG. 4 shows three source groups arranged in a particular priority according to particular types of data processing systems, many other embodiments are possible. For example, more or fewer source groups may be used. A source group may include all data processing systems having a preselected priority level, instead of including systems of a particular type of data processing system. A data processing system may be assigned to a source group according to many other types of selection factors, such as geographic location, the total number of requests made to the DNS server in a certain period of time, whether the request is part of a batch of similar requests, and other factors.

In other examples, the priority of a DNS request can be assigned using other methods. For example, priority can be given to a particular source, a source assigned by a client, or groups of sources assigned by a client. In addition, priority need not be assigned by source groups. For example, the DNS server may contain a database and software that allows the DNS server to identify the type of source data processing system or the identity of the source data processing system and prioritize the request accordingly.

In another illustrative embodiment, prioritization is performed based on information contained in the request. For example, a request can include a tag associated with the data packet that makes up the request. The tag may contain information regarding the priority of the request. DNS server 400 includes an appropriate algorithm to interpret the data in the tag. DNS server 400 then assigns the request a priority based on data contained in the tag. DNS server 400 processes the request according to the assigned priority.

In this illustrative embodiment, the client data processing system adds the tag or provides tag data when sending the request. Thus, some cooperation from the source is required. In another illustrative embodiment, the client data processing system should be a trusted data processing system in order to prevent flooding attacks on the DNS server. A trusted data processing system is a data processing system that DNS server 400 is programmed to recognize as trusted.

In this manner, the client data processing system is capable of assigning the priority of the request. Thus, the client data processing system may assign a high priority to certain requests, and a low priority to others. For example, if a client data processing system needs an immediate domain name translation to process a business transaction, the client data processing system includes data in the tag to indicate that the process has a high priority. On the other hand, if the client data processing system is processing a command to gather a vast number of IP address, and time to complete the command is less of a problem, then each request for translation may contain a tag that places the request at a lower priority.

In addition, the methods for assigning priority to a domain name translation request may be combined. For example, DNS server 400 may contain an algorithm adapted to recognize information contained in tags associated with incoming requests. In addition, the algorithm may be further adapted such that DNS server 400 recognizes the source data processing system sending the request and prioritize the request accordingly. The algorithm may prioritize requests in any particular manner with regard to requests having tags and requests recognized as coming from different source data processing systems.

Whatever method is used to prioritize an incoming request for domain name translation, the DNS server may use a scheduling algorithm to ensure that requests are processed according to the appropriate priority. For example, a request may be queued to one of a set of queues. Requests of a high priority are assigned to a first queue and requests of lower priorities are assigned to other queues accordingly. The DNS server then processes requests in the first queue first, a second queue second, and so on until all requests have been processed. A DNS server may also spend a certain amount of resource processing each queue simultaneously so that all queues receive some attention from the DNS server. However, queues with higher priority receive more resources from the DNS server if the DNS server does not have enough resources to process all incoming requests for domain name translation.

For example, the DNS server may include an algorithm that schedules requests according to a weighting system. Each incoming request receives a weight of 1, 2, or 3, depending on the tag information, the Internet Protocol address of the source, or both. A weight 3 request is assigned to a queue that receives highest priority, a weight 1 request is assigned to a queue that receives lowest priority, and a weight 2 request is assigned to a queue that receives higher priority than a weight 1 request but lower priority than a weight 3 request. In this case, the DNS server processes three packets from the weight 3 queue, then processes two requests from the weight 2 queue, and then processes one request from the weight 1 queue. Thus, $3/6$ (or $1/2$) of the DNS server's resources are used to processes the weight 3 queue, $2/6$ (or $1/3$) of the DNS server's resources are used to process the weight 2 queue, and $1/6$ of the DNS server's resources are used to process the weight 1 queue.

Although the above example shows three queues of weights 1, 2, and 3, any number of queue systems may be used. For example, three priority queues of weight 1, 2, and 4 may be used so that the processor uses $4/7$ of processor resources on the weight 4 queue, $2/7$ of processor resources on the weight 2 queue, and 1/7 of resources on the weight 1 queue. In addition, more or less weight queues may be used.

Figure 5:
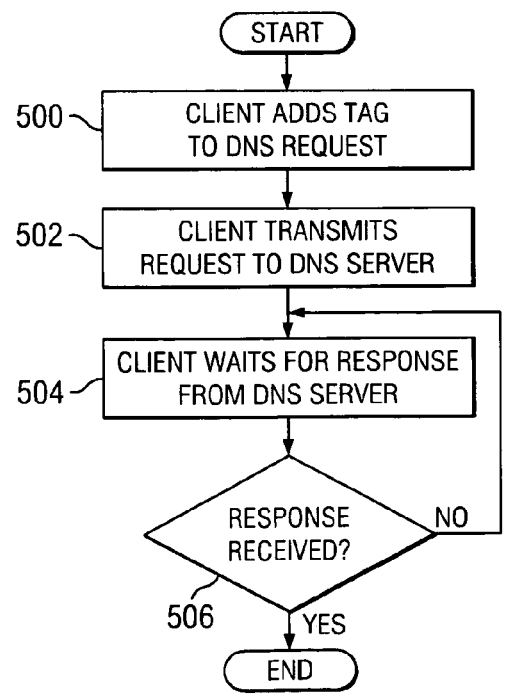
FIG. 5 is a flowchart illustrating a method of generating a DNS request with a priority tag, in accordance with a preferred embodiment of the present invention.

FIG. 5 is a flowchart illustrating a method of generating a DNS request with a priority tag, in accordance with a preferred embodiment of the present invention. The processes begins with a source or client data processing system adding a tag to a request for a domain name translation (step 500). Adding a tag includes both adding extra data to a request data packet and filling in form data in the request data packet, as described further below. The client data processing system then transmits the DNS request to a DNS server (step 502). The client data processing system then waits for a response from the DNS server (step 504). A determination is made whether the client data processing system has received the response (step 506). If a response has not been received, then the process returns to step 504 and the client data processing system continues to wait for a response. If a response has been received, then the process terminates, with the client data processing system processing the response as needed. Returning to step 504, if a predetermined amount of time expires, then the process may terminate prematurely to prevent the process from repeating endlessly.

In an illustrative embodiment, the tag may be any portion of a data packet that makes up the request for translation of a domain name into an Internet Protocol address. For example, the normally unused "Z", 3-bit long field in the fourth octet of the DNS request can be used for this purpose. In this case, the tag allows the DNS server to have up to eight levels of priority. In addition, other parts of the DNS data packet may be used to assign more or less levels of priority.

In another illustrative embodiment, the tag is added to a data packet that makes up the request for translation of a domain name. In this case, the tag may include a preselected number of levels of priority.

Figure 6:
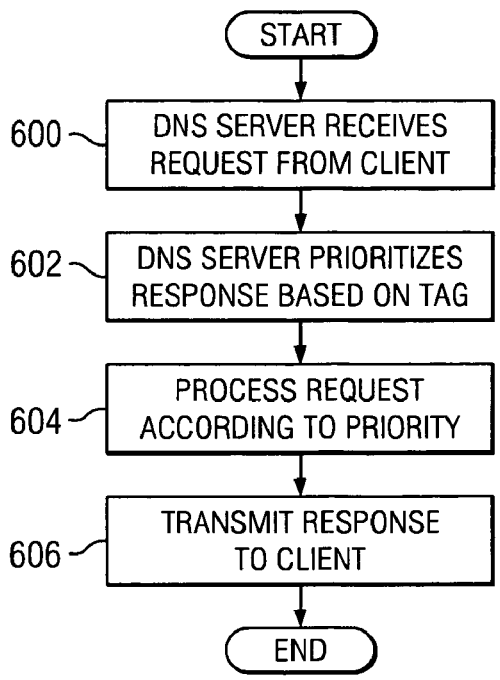
FIG. 6 is a flowchart illustrating a method of priority-based processing of a request for a domain name translation in a DNS server, in accordance with a preferred embodiment of the present invention.

FIG. 6 is a flowchart illustrating a method of priority-based processing of a request for a domain name translation in a DNS server, in accordance with a preferred embodiment of the present invention. The process begins as the DNS server receives a request for translation of a domain name from a client data processing system (step 600). The DNS server prioritizes the request according to data contained in the tag (step 602). The DNS server then processes the request according to a priority determined during step 502 (step 604), with the process terminating thereafter. Finally, the DNS server transmits a response to the client (step 606). The response includes the IP address corresponding to the domain name received by the DNS server.

Figure 7:
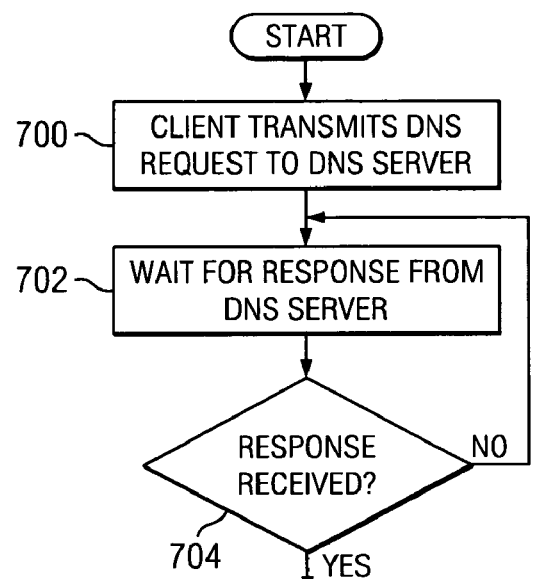
FIG. 7 is a flowchart illustrating a method of generating a DNS request, in accordance with a preferred embodiment of the present invention.

FIG. 7 is a flowchart illustrating a method of generating a DNS request, in accordance with a preferred embodiment of the present invention. The process begins as a source or client data processing system transmits a request to translate a domain name to a domain name system (DNS) server (step 700). The client data processing system then waits for a response from the DNS server (step 702). A determination is made whether the client data processing system has received the response (step 704). If a response has not been received, then the process returns to step 702 and the client data processing system continues to wait for a response. If a response has been received, then the process terminates, with the client data processing system processing the response as needed. Returning to step 702, if a predetermined amount of time expires, then the process may terminate prematurely to prevent the process from repeating endlessly.

Figure 8:
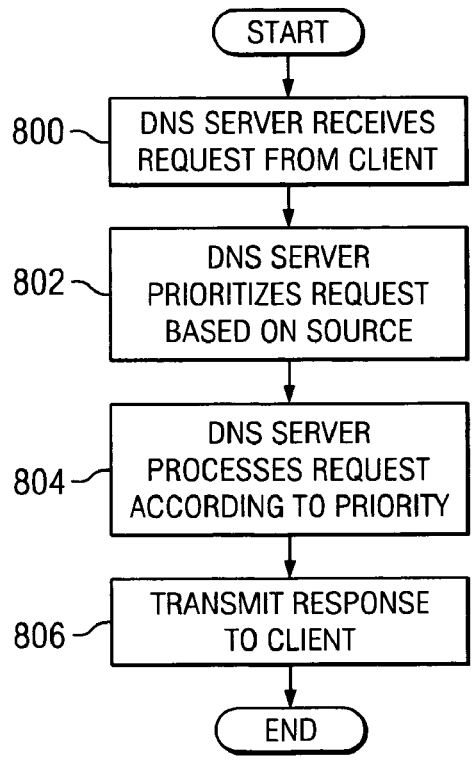
FIG. 8 is a flowchart illustrating a method of priority-based processing of a request for a domain name translation in a DNS server, in accordance with a preferred embodiment of the present invention.

FIG. 8 is a flowchart illustrating a method of priority-based processing of a request for a domain name translation in a DNS server, in accordance with a preferred embodiment of the present invention. The process begins with the DNS server receiving a request to translate a domain name into an IP address (step 800). The DNS server then prioritizes the request based on the nature or type of source data processing system (step 802). For example, the DNS server may maintain a mapping table which is used to look up the priority of the request based on the Internet Protocol address of the source data processing system. In another example, the DNS server prioritizes the request based on a preferred source, sources from a particular client, or other characteristics of the source. The DNS server then processes the request according to a priority established during step 802 (step 804). After processing the request, the DNS server transmits a response to the source or client data processing system (step 806). The response includes the IP address associated with the transmitted domain name. The process terminates thereafter.

The mechanism of the present invention has several advantages over currently available systems and methods for processing requests for domain name translation. For example, DNS requests from important machines or processes in a network have an assured level of service. In addition, the DNS server is less vulnerable to a flooding attack. Furthermore, tag-based or source-based differentiation can be used, depending on resource constraints.

The tag-based methods described herein have the advantage that the mechanism used in the DNS server to route the request to the corresponding priority queue is relatively simple only a simple tag lookup is required. Another advantage is that the granularity of the priority assignment can be at the level of individual processes, rather than the entire machine. Thus, the tag-based method is highly efficient.

The source-based methods described herein have the advantage that no change is needed on the source-side. Source data processing systems requesting domain name translations will function normally. The only change needed is in the DNS server, which will use an algorithm to prioritize domain name translation requests as described above. Thus, source-based methods are easier to implement, particular over very large networks such as the Internet, though are less efficient than tag-based methods.

Although the methods and devices described herein are used to prioritize requests to translate a domain name into an IP address in a DNS server, the methods and devices described herein may be used to prioritize requests of servers on different types of networks. For example, if a local area network (LAN) server receives a request to translate a name of a device on the network, then a tag may be attached to the request. The LAN server prioritizes when to handle the request according to information contained within the tag, as described above. Likewise, the LAN server can prioritize the request based on the identity of the client computer making the request, the identity of the user making the request, or any other parameter. In addition, the methods and devices described above can be used to prioritize other kinds of requests made of data processing systems in a data processing environment, such as a request to print a file, process a file, or execute a program.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a domain name system server, the method comprising:
   receiving a request in the domain name system server, said request comprising a request to translate a domain name into an Internet Protocol address, and a tag, wherein the tag contains a prioritization value;
   prioritizing the request based on the source sending the request and the tag; and processing the request according to a priority assigned to the request during the prioritizing step;
   wherein the prioritizing step further comprises:
   reading the tag associated with the request; and
   prioritizing the request according to information contained in the tag;
   wherein the tag is a Z field in a fourth octet of a data packet comprising the request.

2. The method of claim 1 wherein the prioritizing step further comprises:
   looking up the priority of the request using a mapping table.

3. The method of claim 2 wherein the mapping table is stored on the domain name system server.

4. The method of claim 1 wherein the priority is based on a weighted scale.

5. The method of claim 4 wherein the weighted scale comprises the set of numbers consisting of 1, 2, and 3, and wherein a request of weight 3 is given highest priority, a request of weight 1 is given lowest priority, and a request of weight 2 is given a priority between weight 1 and weight 3.

6. A computer program product in a computer readable medium, the computer program product comprising:
   first instructions for receiving a request in a domain name system server, said request comprising a request to translate a domain name into an Internet Protocol address, and a tag, wherein the tar contains a prioritization value;
   second instructions for prioritizing the request based on the source sending the request and the tag; and
   third instructions for processing the request according to a priority assigned to the request during the prioritizing step;
   wherein the computer program product is further adapted such that the second instructions further comprise:
   first sub-instructions for reading the tag associated with the request; and
   second sub-instructions for prioritizing the request according to information contained in the tag;
   wherein the tag is a Z field in a fourth octet of a data packet comprising the request.

7. The computer program product of claim 6 wherein the second instructions further comprise:
   sub-instructions for looking up the priority of the request using a mapping table.

8. The computer program product of claim 7 wherein the mapping table is stored on the domain name system server.

9. The computer program product of claim 6 wherein the priority is based on a weighted scale.

10. The computer program product of claim 9 wherein the weighted scale comprises the set of numbers consisting of 1, 2, and 3, and wherein a request of weight 3 is given highest priority, a request of weight 1 is given lowest priority, and a request of weight 2 is given a priority between weight 1 and weight 3.

11. A data processing system comprising: a bus;
    a memory operably connected to the bus, wherein a set of instructions are located in the memory;
    a processor operably connected to the bus, said processor executing the set of instructions to:
    receive a request in a domain name system server, said request comprising a request to translate a domain name into an Internet Protocol address, and a tag, wherein the tag contains a prioritization value; prioritize the request based on the source sending the request and the tag; and process the request according to a priority assigned to the request;
    wherein in executing the instructions to prioritize the request, the processor executes the instructions to:
    read the tag associated with the request; and prioritize the request according to information contained in the tag;
    wherein the tag is a Z field in a fourth octet of a data packet comprising the request.

12. The data processing system of claim 11 wherein in executing the instructions to prioritize the request, the processor executes the instructions to:
    look up the priority of the request using a mapping table.

13. The data processing system of claim 11 wherein the mapping table is stored on the domain name system server.

14. The data processing system of claim 11 wherein the priority is based on a weighted scale.

* * * * *